(12) United States Patent
Memmer et al.

(10) Patent No.: US 6,651,823 B1
(45) Date of Patent: Nov. 25, 2003

(54) PLASTIC FILTER HOUSING FORMED FROM MULTIPLE SECTIONS AND HAVING A SKEWED WELD SEAM, AND FILTER INCORPORATING SAME

(75) Inventors: Timothy L. Memmer, Perrysburg, OH (US); Gerard W. Bilski, Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/705,961

(22) Filed: May 15, 2000

(51) Int. Cl.⁷ .............................................. B01D 27/08
(52) U.S. Cl. ..................... 210/435; 210/433.1; 220/678
(58) Field of Search .......................... 210/433.1, 435, 210/440, 443, 444, 446, 448, 445, 453, 455; 220/612, 613, 678, 679, 680; 123/514

(56) References Cited

U.S. PATENT DOCUMENTS

| | | | |
|---|---|---|---|
| 3,003,870 A | * 10/1961 | Belgarde et al. ............ 210/446 |
| 3,189,257 A | * 6/1965 | Clausen ...................... 220/678 |
| 3,693,410 A | 9/1972 | Robercht et al. |
| 3,815,752 A | 6/1974 | Hoffman et al. |
| 4,253,967 A | 3/1981 | Raible |
| 4,702,790 A | 10/1987 | Hogh et al. .................. 156/293 |
| 4,755,108 A | * 7/1988 | Todescat et al. ............ 417/312 |
| 4,814,087 A | * 3/1989 | Taylor ........................ 123/510 |
| 4,886,533 A | 12/1989 | Sakashita et al. |
| 4,992,166 A | 2/1991 | Lowsky et al. ............. 210/130 |
| 5,076,920 A | 12/1991 | Danowski et al. .......... 210/243 |
| 5,382,359 A | 1/1995 | Brandt ....................... 210/243 |
| 5,876,599 A | * 3/1999 | Sylvester et al. ........... 210/232 |
| 6,171,492 B1 | * 1/2001 | Hedgepeth et al. ......... 210/243 |
| 6,231,318 B1 | * 5/2001 | Cotton et al. ............... 123/509 |

FOREIGN PATENT DOCUMENTS

| | | |
|---|---|---|
| DK | 10 29 537 B | 5/1958 |
| EP | 0 343 976 A | 11/1989 |
| GB | 1 016 431 A | 1/1966 |
| GB | 2 155 355 A | 9/1985 |

OTHER PUBLICATIONS

Patent Abstracts of Japan vol. 013, No. 500 (M–891), Nov. 10, 1989 & JP 01 202373 A (Fuji Photo Film Co Ltd), Aug. 15, 1989 abstract.

* cited by examiner

*Primary Examiner*—Matthew O. Savage

(57) ABSTRACT

A hollow plastic filter housing which is assembled from multiple parts, in which two primary housing members are alignable along a seam, and wherein the seam is disposed in a skewed orientation with respect to a longitudinal axis of the housing. The filter housing includes a first housing member and a second housing member which is attachably alienable with the first housing member. The first and second housing members are abuttingly aligned and joined together along a weld seam which is skewed with respect to a longitudinal axis of the housing. The weld seam may be disposed at an angle or alternatively, may be curved and may include corresponding alignment structures.

8 Claims, 8 Drawing Sheets

PLASTIC FILTER HOUSING FORMED FROM MULTIPLE SECTIONS AND HAVING A SKEWED WELD SEAM, AND FILTER INCORPORATING SAME

BACKGROUND OF THE INVENTION

1. Field of the invention

The present invention relates to a hollow molded plastic housing, formed from multiple parts, in which two parts intersect at, and are joined along a weld seam. More particularly, the present invention relates to a molded plastic housing of the type described and having a skewed weld seam, that is, having a weld seam which does not coincide with any plane perpendicular to a longitudinal axis of the assembly.

2. Description of the Background Art

Many different types of molded plastic housings are known and in use today. Plastic is increasingly a material of choice in modem manufacturing. As an example, certain plastic filter housings have been known and made of multiple parts which are glued or welded together around a filter element.

For example, many commercially available disposable in-line fuel filters include a plastic housing with two generally cup-shaped sections, which are joined at the open ends thereof at a symmetrical weld seam. This known type of fuel filter also has relatively narrow inlet and outlet tubes extending outwardly away from opposite ends of the housing.

One example of a fuel filter with a housing according to this known design is given in U.S. Pat. No. 5,076,920.

A need still exists in the art for a plastic housing made in multiple pieces in which the number of pieces is kept as low as possible.

A continuing need in the filter industry also exists for innovative filter designs, and for economies of manufacturing.

SUMMARY OF THE INVENTION

The present invention provides a hollow plastic filter housing which is assembled from multiple parts, in which two primary housing members are alignable along a seam, and wherein the seam is disposed in a skewed orientation with respect to a longitudinal axis of the housing. A filter housing according to the present invention, generally, includes a first housing member and a second housing member which is alignable with the first housing member, and is provided for attachment thereto.

Accordingly, it is an object of the present invention to provide a plastic housing, formed from multiple pieces, in which two complimentary primary pieces are joined along a weld seam which is skewed from the orthogonal, to allow the housing to be made in fewer pieces than would otherwise be possible.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

First Preferred Embodiment

Figure 1:
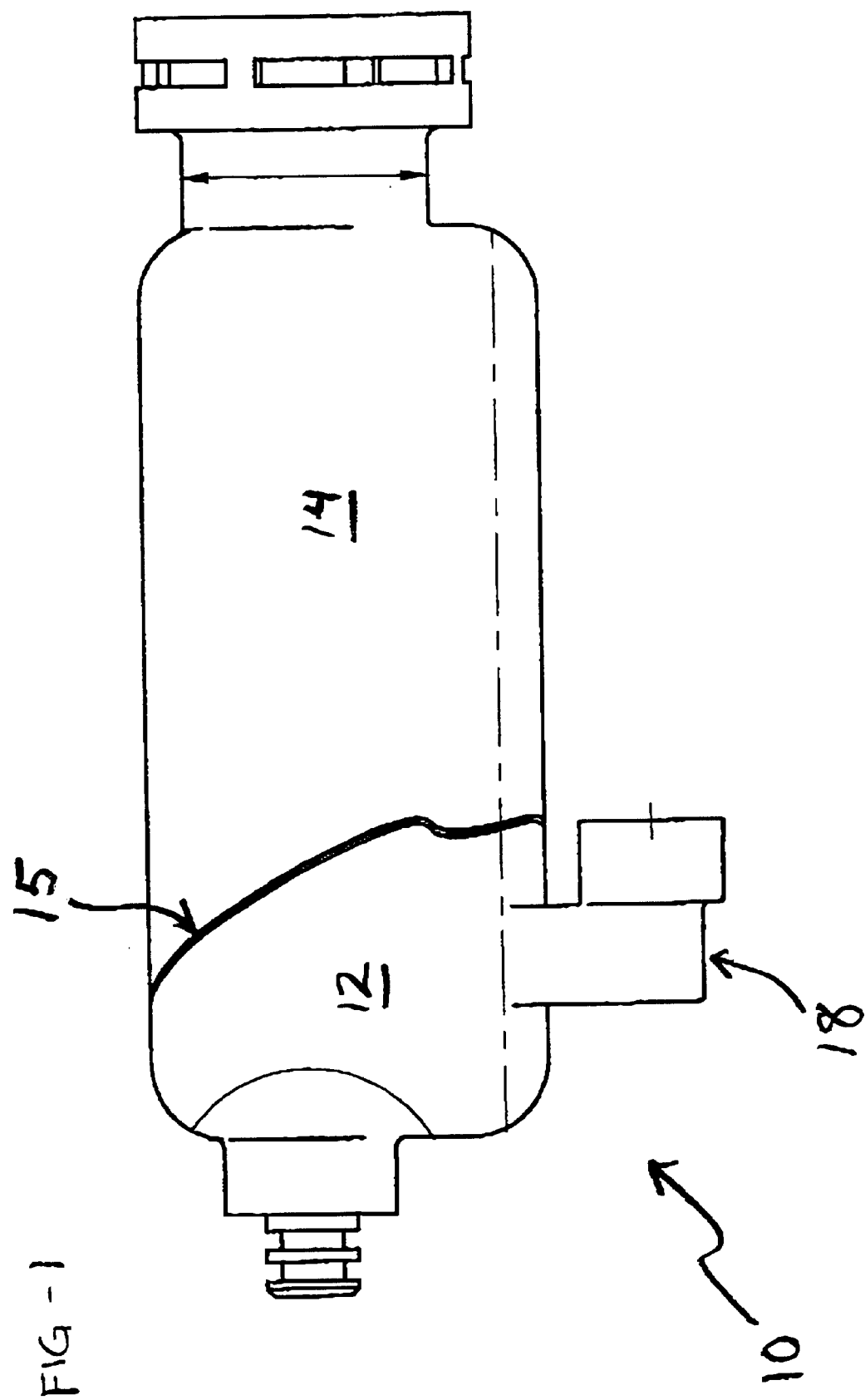
FIG. 1 is an assembled side plan view of a fuel filter housing according to a first embodiment of the present invention.
Figure 2:
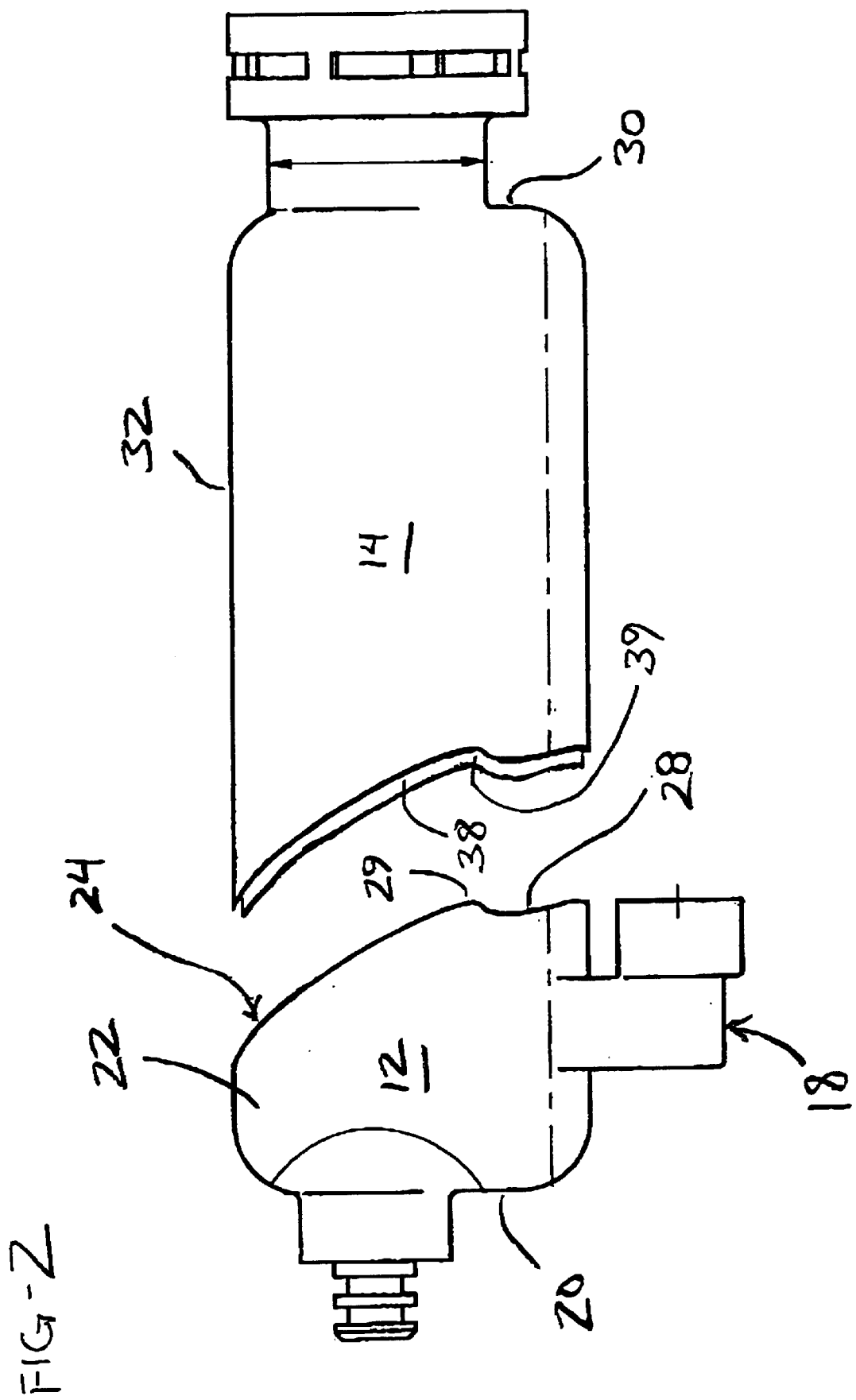
FIG. 2 is an exploded side plan view of a fuel filter housing according to the first embodiment of the present invention.
Figure 3:
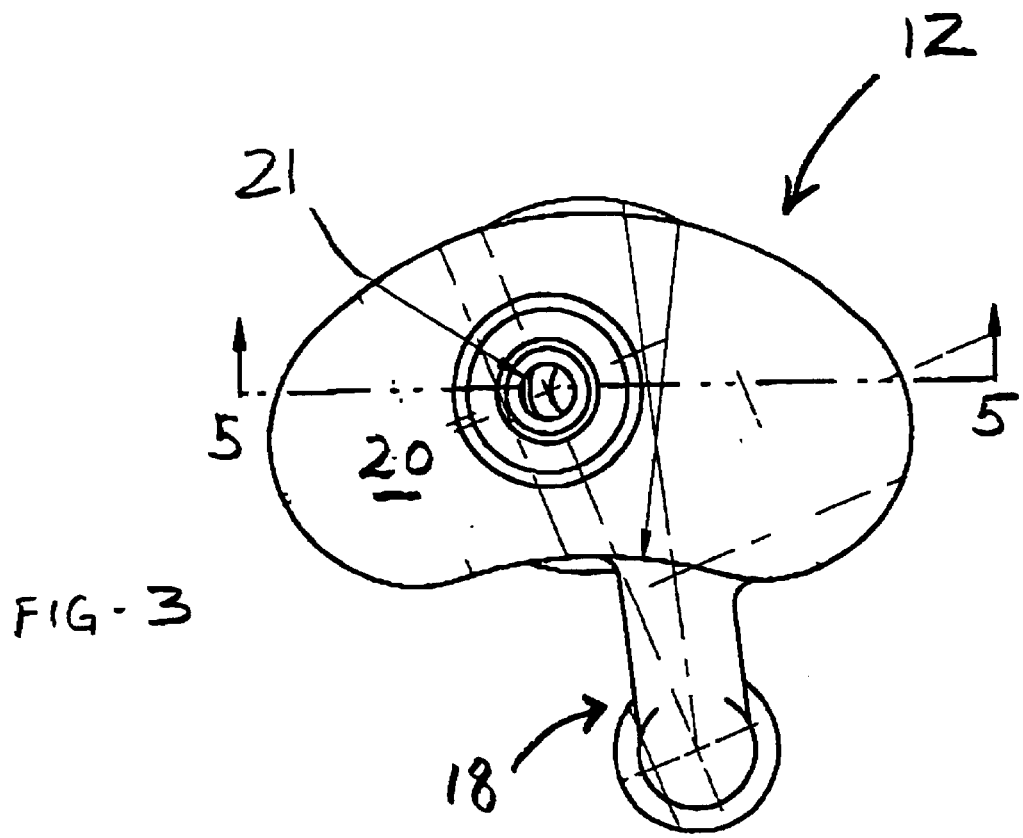
FIG. 3 is an end plan view of a first housing member which is a first component of the housing of FIGS. 1–2.
Figure 4:
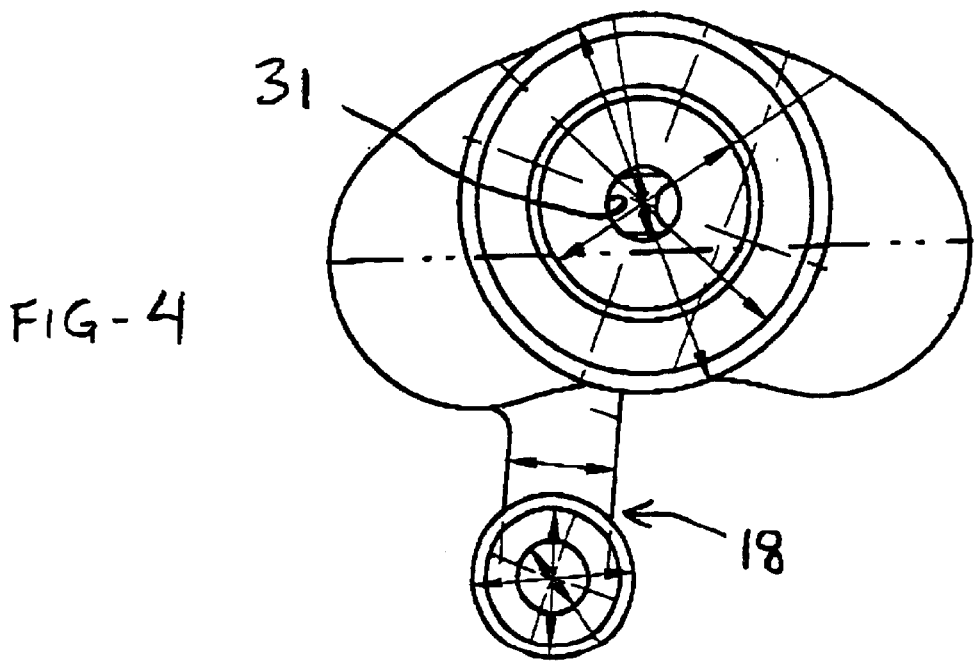
FIG. 4 is an end plan view of a second housing member which is a second component of the housing of FIGS. 1–2.
Figure 5:
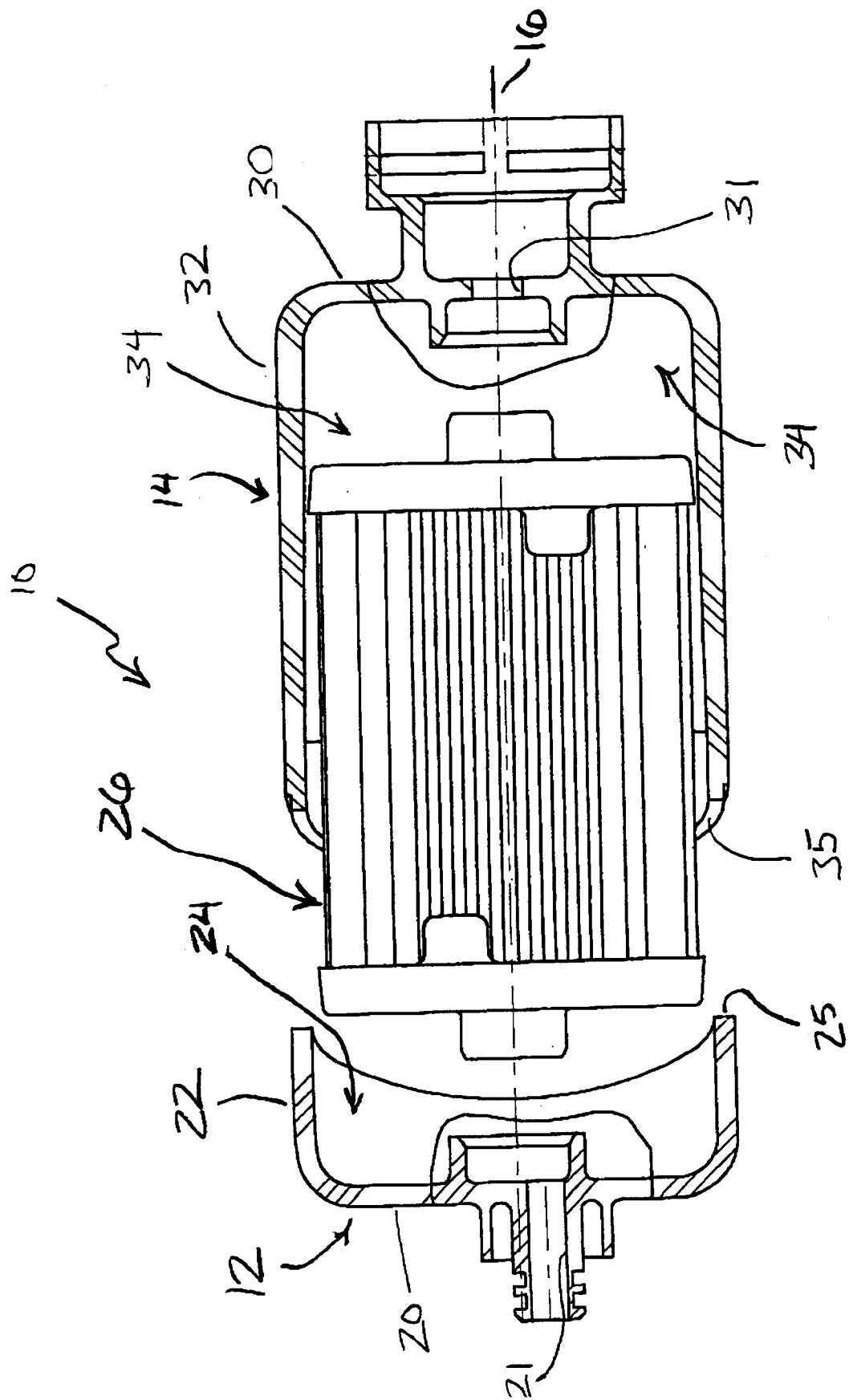
FIG. 5 is an exploded top plan view of a fuel filter which includes the housing of FIG. 2 as a component thereof.
Figure 6:
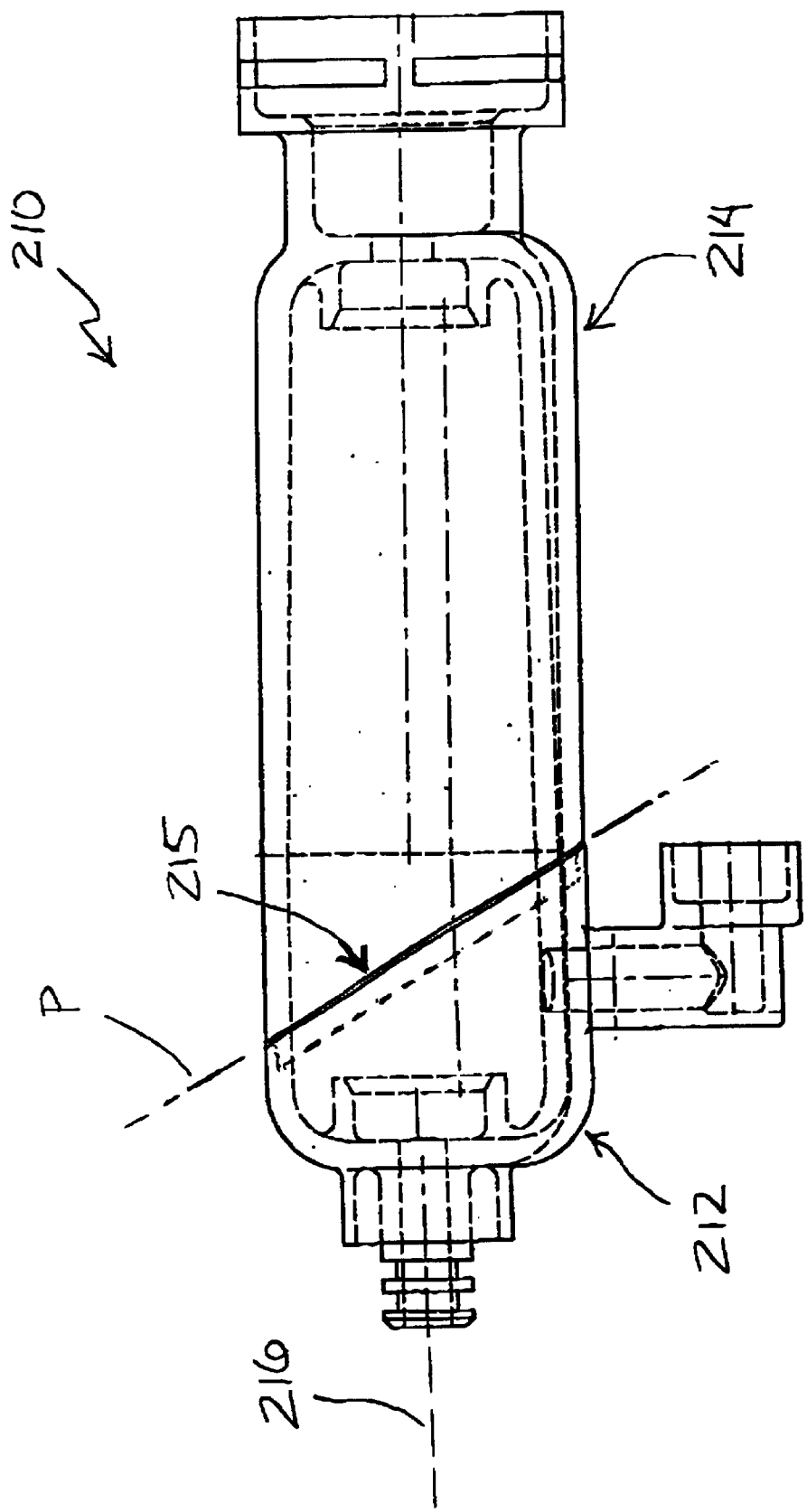
FIG. 6 is an assembled side plan view of a fuel filter housing according to a second embodiment of the present invention.
Figure 7:
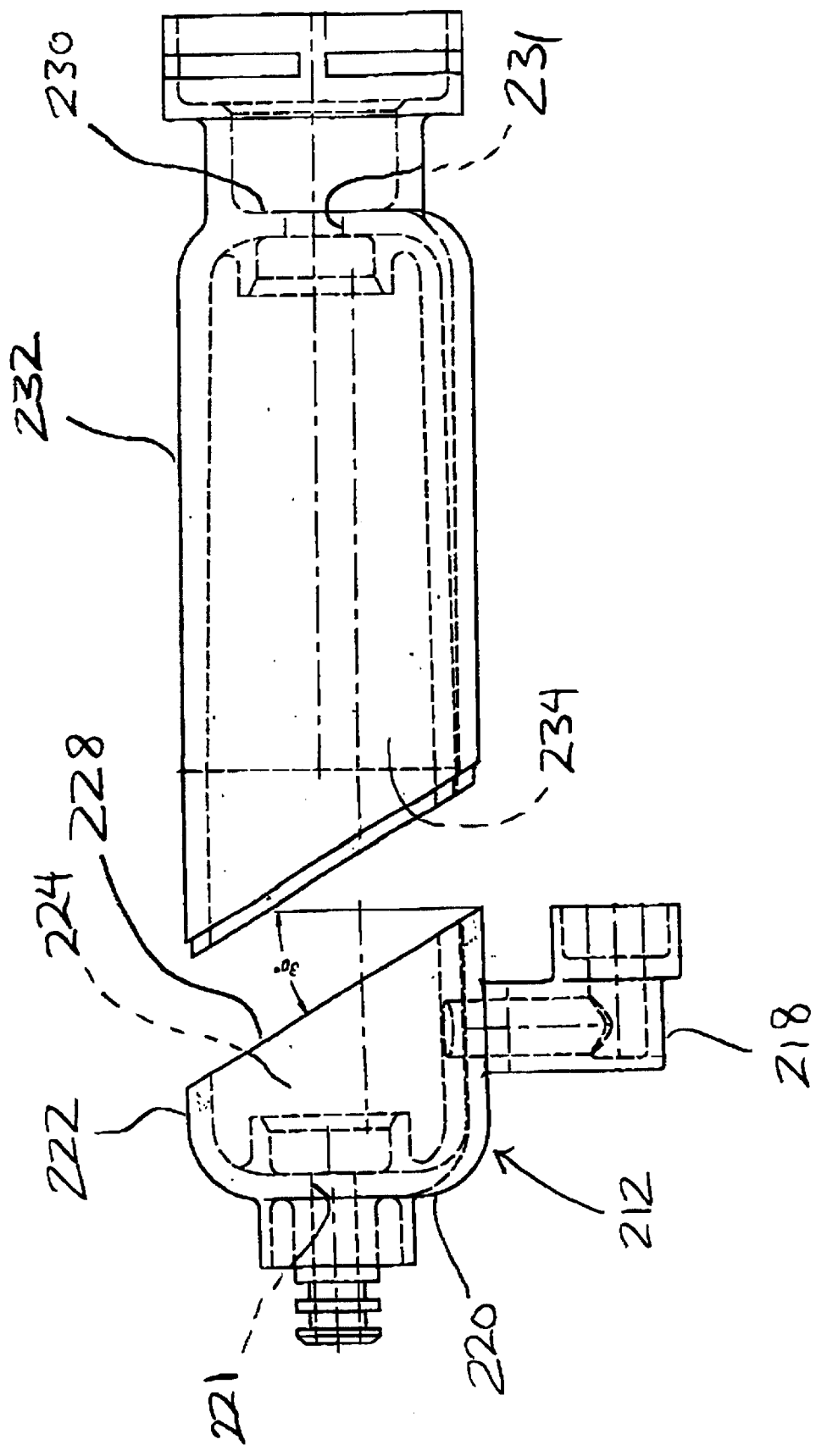
FIG. 7 is an exploded side plan view of a fuel filter housing according to the second embodiment of the present invention.

Referring now to FIGS. 1–2 of the drawings, a fuel filter housing, in accordance with a first embodiment of the present invention, is shown generally at 10. The housing 10 is made up of two complimentary housing members 12, 14 joined together as an integral unit. The first and second housing members 12, 14 share a common longitudinal axis 16 (FIG. 5). As seen in the end views of FIGS. 3 and 4, the housing 10, in the depicted embodiment, has a substantially kidney-shaped outline and cross-sectional shape.

The housing members are connected and sealingly joined together along a seam 15. In the practice of the present invention, the seam 15 is skewed, away from alignment with a plane transverse to the longitudinal axis 16 of the housing 10, to allow the first housing member 12 to be made with an external flow tube 18, formed as an integral part thereof, in a single molding operation.

The first housing member 12 has a first end portion 20 and a first side wall 22 integrally formed with, and extending away from the first end portion. The first end portion 20 and the first side wall 22 cooperate to define a first hollow socket 24, for receiving one end of a filter element 26 therein. As best seen in FIG. 5, the first housing member has a first aperture 21 formed through the first end portion 20 thereof. The first aperture 21 is in fluid communication with the first hollow socket 24. The first aperture 21 may form an outlet for the housing 10.

The first side wall 22 has an edge 25 defining a first mating surface 28, with a first shape, opposite the first end wall 20. The external flow tube 18 extends outwardly away from the first side wall 22, and is also in fluid communication with the first hollow socket 24.

In a complimentary fashion to that discussed above in connection with the first housing member 12, the second housing member 14 has a second end portion 30 and a second side wall 32 extending away from the second end portion. The second end portion 30 and the second side wall 32 cooperate to define a second hollow socket 34 for receiving a second end of the filter element 26 therein. The second side wall has an edge 35 defining a second mating surface 38, with a second shape, opposite the second end wall 30.

Most preferably, the second housing member 14 has a second aperture 31 formed through the second end portion 30 thereof The second aperture 31 is in fluid communication with the second hollow socket 34. The second aperture 31 may form a bypass outlet channel for the housing 10.

The second mating surface 38 corresponds to, and is alignable with the first mating surface 28, to define the seam IS between the first and second housing members.

As noted, the seam is disposed in a skewed orientation with respect to a plane which is transverse to the longitudinal axis 16 of the housing.

In the embodiment of FIGS. 1–5, the seam 15 is curvilinear and non-planar. The seam 15 is somewhat free-form in shape, including curved portions. Also in this embodiment, the first mating surface 28 includes a protrusion which fits into a notch 39 of the second mating surface 38, so that there is only one correct way to align the first and second housing members 12, 14. The seam 15 may be symmetrical or asymmetrical, as desired.

Second Preferred Embodiment

Figure 8:
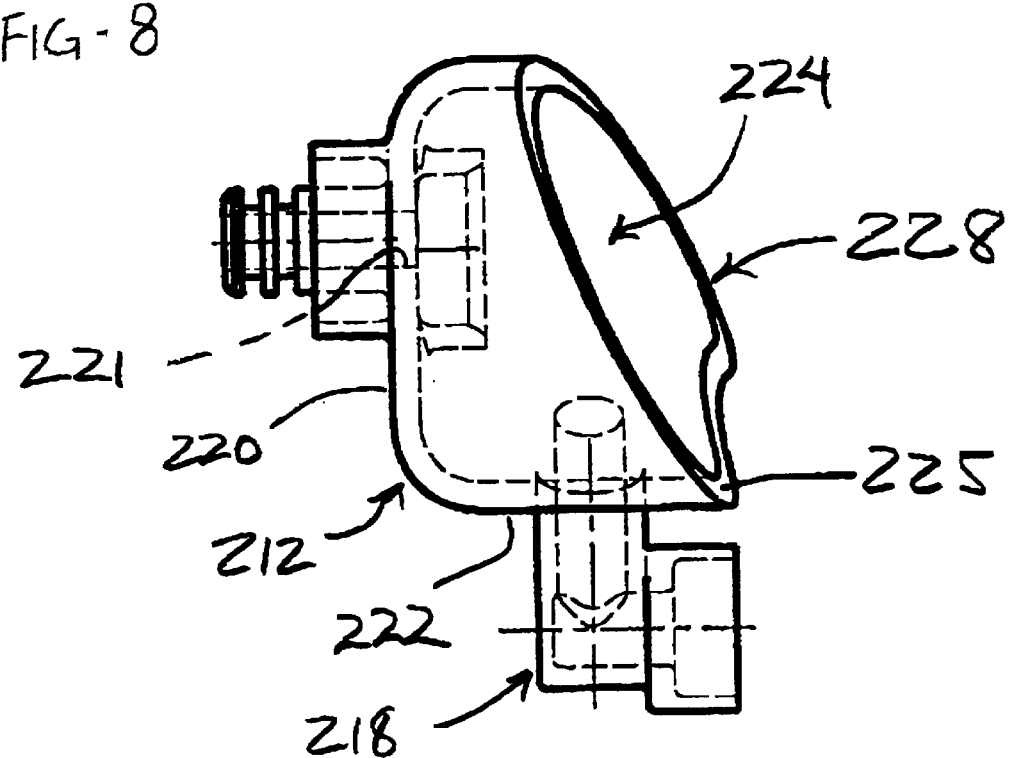
FIG. 8 is a perspective view of a first housing member which is a first component of the housing of FIGS. 6–7.
Figure 9:
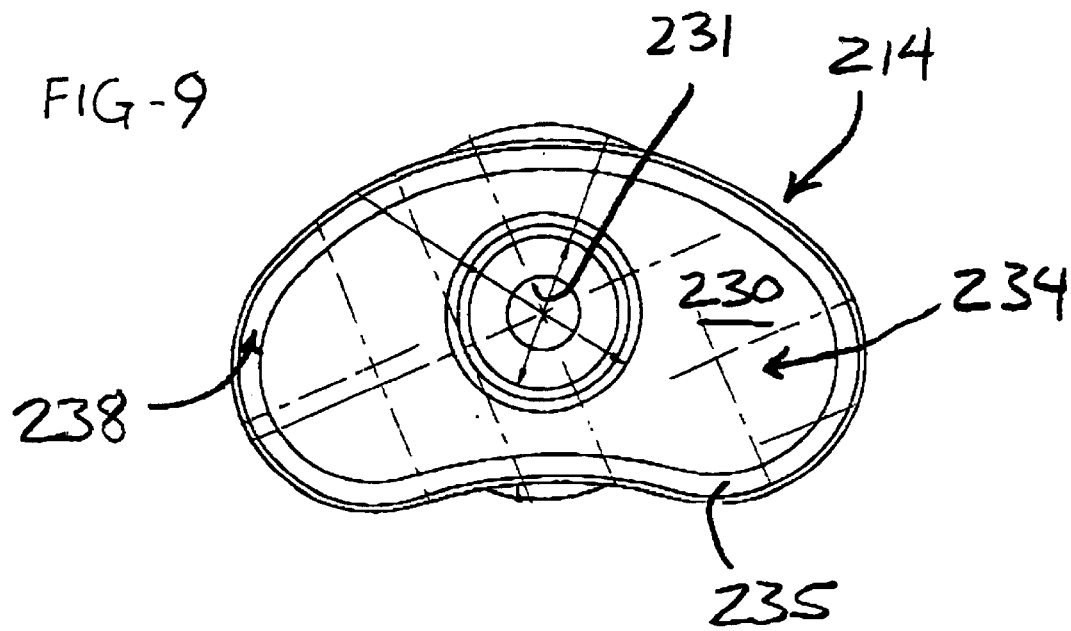
FIG. 9 is an internal end plan view of a second housing member which is a second component of the housing of FIGS. 6–7, showing the interior thereof.
Figure 10:
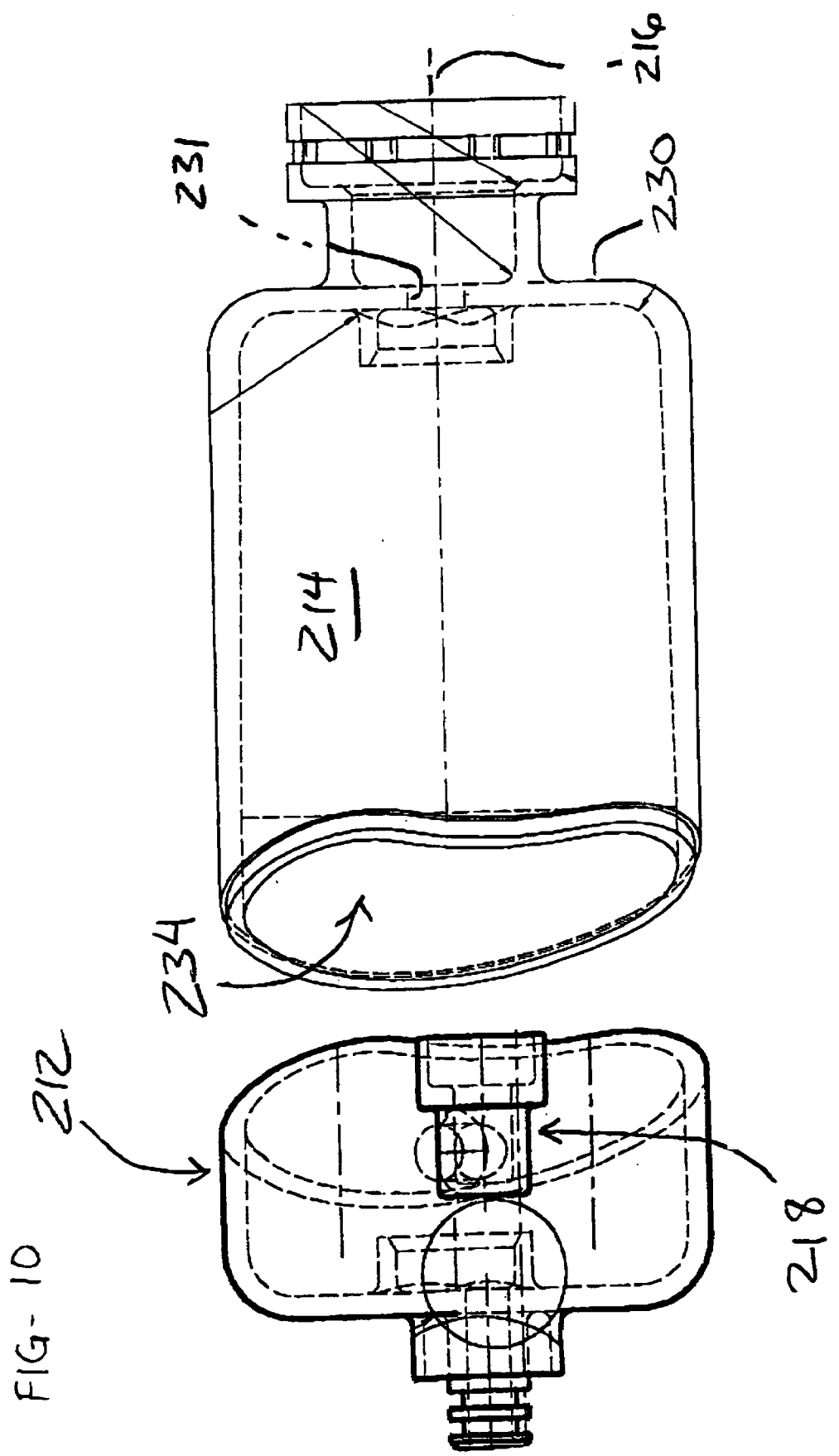
FIG. 10 is an exploded top plan view of the housing of FIGS. 6–7.

Referring now to FIGS. 6–10 of the drawings, a fuel filter housing, in accordance with a second embodiment of the present invention, is shown generally at 210. The housing 210 is made up of two complimentary housing members 212, 214 joined together as an integral unit. The first and second housing members 212, 214 share a common longitudinal axis 216 (FIG. 10). As seen best in the interior view of the first housing member 212 in FIG. 9, the housing 210, in the second depicted embodiment, has a substantially kidney-shaped outline and cross-sectional shape. The housing members 212, 214 are connected and sealingly joined together along a seam 215. In the practice of the present invention, the seam 215 is skewed, away from the orthogonal. In other words, the seam 215 is skewed out of alignment with a plane transverse to the longitudinal axis 216 of the housing 210, to allow the first housing member 212 to be made with an external flow tube 218, formed as an integral part thereof, in a single molding operation.

The housing 210 according to the second depicted embodiment is substantially identical to housing 10 according to the first embodiment, except for the difference in the shapes of the first and second housing members at the respective seams 15, 215.

In the second embodiment of the housing 210, the first housing member 212 has a first end portion 220 and a first side wall 222 integrally formed with, and extending away from the first end portion. The first end portion 220 and the first side wall 222 cooperate to define a first hollow socket 224, for receiving one end of a filter element 26 therein. (The filter element is the same as the element 26 shown in FIG. 5). As best seen in FIG. 8, the first housing member 220 has a first aperture 221 formed through the first end portion 220 thereof. The first aperture 221 is in fluid communication with the first hollow socket 224. The first aperture 221 may form an outlet for the housing 210.

The first side wall 222 has an edge 225 defining a first mating surface 228, with a first shape, opposite the first end wall 220. The external flow tube 218 extends outwardly away from the first side wall 222, and is also in fluid communication with the first hollow socket 224.

In a complimentary fashion to that discussed above in connection with the first housing member 212, the second housing member 214 has a second end portion 230 and a second side wall 232 extending away from the second end portion. The second end portion 230 and the second side wall 232 cooperate to define a second hollow socket 234 for receiving a second end of the filter element 26 therein. The second side wall has an edge 235 defining a second mating surface 238, with a second shape, opposite the second end wall 230.

Most preferably, the second housing member 214 has a second aperture 231 formed through the second end portion 230 thereof The second aperture 231 is in fluid communication with the second hollow socket 234. The second aperture 231 may form a bypass outlet channel for the housing 210.

The second mating surface 238 corresponds to, and is alignable with the first mating surface 228, to define the seam 215 between the first and second housing members 212, 214, respectively.

As noted, the seam 215 is disposed in a skewed orientation with respect to a plane which is transverse to the longitudinal axis 16 of the housing.

In the embodiment of FIGS. 6–10, the seam 215 is disposed substantially coincident with a plane P (FIG. 6), which intersects the longitudinal axis 216 of the housing 210 at an angle. In the illustrated embodiment, the seam 215 is disposed along a plane P offset 30 degrees from the orthogonal, as shown.

As best seen in FIG. 9, the depicted filter housing 210 has a substantially kidney-shaped cross-section.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A hollow filter housing comprising first and second housing members sealingly joined together along a seam, wherein said first housing member is a molded plastic housing member having an end portion and a side wall extending away from the end portion, the end portion and the side wall cooperating to define a hollow socket having a longitudinal axis extending through said end portion, said side wall having an edge defining a mating surface that forms said seam with said second housing member, wherein said mating surface would form an opening into said hollow socket if said housing members were parted along said seam;

wherein the side wall of said first housing member includes an aperture with a tube section having an inner diameter and an outer diameter and being integral to said side wall and extending outwardly therefrom and the end portion of said first housing member includes an aperture with a tube section having an inner diameter and an outer diameter and being integral to said end portion and extending outwardly therefrom, and said seam is disposed in a skewed orientation with respect to said longitudinal axis such that an imaginary projection of the inner diameter of the tube section integral to the side wall would extend past the seam through said opening when said housing members are not sealingly joined together, and an imaginary projection of the inner diameter of the tube section integral to the end portion would extend past the seam through said opening when said housing members are not sealingly joined together.

2. The filter housing of claim 1, wherein the tube section integral to the side wall includes a substantially 90° bend therein.

3. The filter housing, of claim 1, wherein the seam is non-planar.

4. The filter housing of claim 1, wherein the housing has a substantially kidney-shaped cross-section.

5. The filter housing of claim 1 wherein the aperture in the housing member end portion is a filter outlet.

6. The filter housing of claim 1, wherein said aperture in the housing member side wall is a filter inlet.

7. A filter comprising the filter housing of claim 1 having a filter element disposed therein.

8. The filter housing of claim 1 wherein said longitudinal axis is substantially parallel to said side wall.

* * * * *